United States Patent
Dietrich et al.

(10) Patent No.: US 6,975,959 B2
(45) Date of Patent: Dec. 13, 2005

(54) ORIENTATION AND NAVIGATION FOR A MOBILE DEVICE USING INERTIAL SENSORS

(75) Inventors: Arne Dietrich, Mountain View, CA (US); Hauke Schmidt, East Palo Alto, CA (US); Jean-Pierre Hathout, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/308,730

(22) Filed: Dec. 3, 2002

(65) Prior Publication Data

US 2004/0107072 A1   Jun. 3, 2004

(51) Int. Cl.[7] .............................................. G06F 15/00
(52) U.S. Cl. ........................ 702/153; 348/116; 345/619
(58) Field of Search ............................... 702/141–145, 702/150–153, 68, 94, 95, 104, 116, 155, 188; 701/208, 1, 207, 210, 213, 220, 221; 704/270; 342/357.1; 348/116, 144, 239; 345/619

(56) References Cited

U.S. PATENT DOCUMENTS

| | | | |
|---|---|---|---|
| 5,166,789 A * | 11/1992 | Myrick ........................ 348/144 |
| 5,267,042 A * | 11/1993 | Tsuchiya et al. ............. 348/239 |
| 5,388,990 A * | 2/1995 | Beckman ...................... 434/38 |
| 5,566,073 A * | 10/1996 | Margolin ..................... 701/213 |
| 5,764,786 A * | 6/1998 | Kuwashima et al. ......... 382/107 |
| 5,819,206 A * | 10/1998 | Horton et al. ............... 702/150 |
| 5,894,323 A * | 4/1999 | Kain et al. ................... 348/116 |
| 5,936,553 A * | 8/1999 | Kabel ....................... 340/995.14 |
| 6,061,068 A * | 5/2000 | Hoffman, II et al. ........ 345/619 |
| 6,130,705 A * | 10/2000 | Lareau et al. ................ 348/144 |
| 6,154,723 A * | 11/2000 | Cox et al. .................... 704/270 |
| 6,308,134 B1 * | 10/2001 | Croyle et al. ................ 701/220 |
| 6,314,370 B1 * | 11/2001 | Curtright ..................... 701/213 |
| 6,337,688 B1 * | 1/2002 | Berstis ........................ 345/473 |
| 6,429,812 B1 * | 8/2002 | Hoffberg .................. 342/357.1 |
| 6,442,476 B1 * | 8/2002 | Poropat ....................... 701/207 |
| 6,529,827 B1 * | 3/2003 | Beason et al. ............... 701/213 |
| 6,545,598 B1 * | 4/2003 | de Villeroche .............. 340/438 |
| 6,549,828 B1 * | 4/2003 | Garrot, Jr. et al. ............... 701/1 |
| 6,665,611 B1 * | 12/2003 | Oran et al. .................. 701/213 |
| 6,701,250 B1 * | 3/2004 | Rychlak ...................... 701/210 |
| 2002/0049532 A1 * | 4/2002 | Nakamura .................. 701/208 |
| 2002/0167442 A1 * | 11/2002 | Taylor .................... 342/357.09 |
| 2003/0125875 A1 * | 7/2003 | Lee ............................. 701/221 |

OTHER PUBLICATIONS

U.S. Appl. No. 09/934,423, filed Aug. 21, 2001, Hathout et al.

* cited by examiner

*Primary Examiner*—Marc S. Hoff
*Assistant Examiner*—Mohamed Charioui
(74) *Attorney, Agent, or Firm*—Kenyon & Kenyon (57) ABSTRACT

A mobile device for enhanced navigation and orientation including a visualization interface, a first sensor for providing signals indicative of a movement of the mobile device, a second sensor for providing further signals indicative of a movement of the mobile device, and a processor receiving signals from the first and second sensors, calculating a position and an orientation of the mobile device from the received signals, and generating a real time simulation of an environment via the visualization interface based on the position and orientation of the mobile device. According to an embodiment, the first and second sensors are implemented as an inertial sensor and a GPS receiver, respectively.

23 Claims, 6 Drawing Sheets

ORIENTATION AND NAVIGATION FOR A MOBILE DEVICE USING INERTIAL SENSORS

FIELD OF THE INVENTION

The present invention relates to visual navigation systems, and in particular, but without limitation, relates to a system and method for providing enhanced user orientation and navigation for a mobile device using multiple sensors.

BACKGROUND INFORMATION

Current visual navigation interface systems ("visualization interfaces") for mobile devices typically suffer from drawbacks in terms of their convenience of use and in the realism of the visual simulation which they provide. Visualization interfaces for mobile devices usually require active user input to provide an orientation for visualization. The user may provide the input via an auxiliary device such as a mouse, a keypad, or a touch-screen cursor. In this case, if a user wishes to obtain visual information corresponding to a particular viewing orientation, he or she may be required to point a cursor or mouse in the selected direction. This active input requires the use of a free hand, which can be inconvenient when the visualization interface is incorporated in a handheld device such as a Personal Digital Assistant (PDA), already occupying the use of one hand.

Even those visualization interfaces that are equipped with Global Positioning System (GPS) receivers and obtain location coordinates thereby, generally provide two-dimensional "map" views with only limited capability to modify the map orientation. In these systems, the user's location may be highlighted on the two-dimensional map, and as the user's location changes, the map updates sequentially to reflect the location change. The sequential map images appear in a "north up" configuration, or in a "course up" configuration as the user is moving in a particular course direction. Additionally, current GPS-based visualization interfaces have only limited capabilities for three-dimensional simulation because the GPS reception system usually does not provide attitude (angular orientation) information.

It would thus be desirable to provide a manually convenient visualization interface that allows a user to navigate in a map or visualize an environment in three dimensions in motion or at rest with flexibility in terms of view orientation.

SUMMARY OF THE INVENTION

In accordance with this aim, the present invention provides a mobile device for enhanced navigation and orientation that includes a visualization interface, a first sensor for providing signals indicative of a movement of the mobile device, a second sensor for providing further signals indicative of a movement of the mobile device, and a processor that receives the signals from the first sensor and the second sensor, calculates a three-dimensional position and a three-dimensional orientation of the mobile device from the received signals, and generates a real time simulation of an environment via the visualization interface based on the calculated position and orientation.

According to an embodiment of the mobile device, the first sensor includes an inertial sensor.

The mobile device according to the present invention also facilitates user control of navigation by providing that by manual movement of the mobile device, sensed by the first and second sensors, a user can control a point of view, a location and an attitude in either a two-dimensional or a three-dimensional simulation of the environment.

According to one implementation, the inertial sensor includes linear acceleration sensors that measure accelerations of the mobile device along x, y, and z directional axes, respectively. The inertial sensor may also include rotational velocity sensors that measure rotational velocities of the mobile device about the respective x, y, and z axes.

According to an embodiment, the second sensor includes a GPS receiver. Advantageously, navigational information derived from the GPS receiver may be used to determine a drift of the inertial sensor.

According to another aspect, the processor of the mobile device is configured to use signals from the inertial sensor to activate/deactivate user control operations. For example, abrupt movements can be used to turn on/off the display, or activate/deactivate a function such as a zoom out or zoom in.

The mobile device may also be equipped with means for receiving and updating navigational information pertinent to a specific environment in order to obtain a large amount of data that may be too extensive for internal memory resources to store continually.

With aid of the specific information, the mobile device may be used as a navigational tour guide. In this regard, the navigational information may include map and image data for fairs, exhibits, museums, conferences, public buildings, and campuses, among other environments. Various specialized applications to which the mobile device of the present invention can be beneficially applied include maritime navigation and simulating (and providing backup for) aeronautical navigation equipment.

According to a second embodiment, both the first and second sensors include GPS receivers.

In another aspect, the present invention provides a mobile device for enhanced navigation and orientation that includes a user interface having a visual display and an inertial sensor which detects movements of the mobile device and provides feedback signals that are used for user control and for generating an image in the visual display. A location and an attitude of the mobile device can be derived from the feedback signals.

According to one implementation, the mobile device includes a processor, and a means for receiving local navigation image information, wherein the processor computes the location and attitude of the mobile device from the signals generated by the inertial sensor, and from the location, attitude, and information received via the receiving means, generates an image of a local environment which depicts the environment viewed from the computed location and attitude of the mobile device. According to this implementation, the mobile device may include a GPS receiver. In this case, the processor computes location with aid of GPS information derived from the GPS receiver.

According to a particular embodiment, the inertial sensor includes linear acceleration sensors for sensing acceleration in x, y, and z directional axes, and rotational velocity sensors for sensing rotational velocity about the x, y, and z axes.

In response to certain signals received from the inertial sensor, the processor can activate or deactivate controls of the user interface. For example, abrupt movements of the mobile device conducted by the user, which cause generation of high frequency signals, can trigger the processor to activate or deactivate controls of the user interface, providing convenient manual control of the functionality of the mobile device.

According to a further aspect, the present invention provides a mobile device for enhanced navigation and orientation that includes a visualization interface and a sensor for detecting an attitude of the mobile device and generating corresponding signals that provide feedback for user control and for generating an image in the visualization interface that corresponds in viewpoint to the detected attitude of the mobile device.

According to an implementation, the sensor includes at least one inertial sensor that detects a rotational velocity of the mobile device. According to a further implementation, the mobile device also includes a position sensor, means for receiving local navigation image information, and a processor that uses the signals provided by the position sensor, the signals from the attitude sensor, and received local navigation image information, to generate a real-time two-dimensional view and a three-dimensional simulation of a navigated environment.

The mobile device of claim may also include a GPS receiver coupled to the processor for assisting in calculation of a position of the mobile device.

The present invention also provides a method for navigating using a mobile device having a visual display. This method includes detecting a first set of signals indicative of movement of the mobile device, detecting a second set of signals indicative of movement of the mobile device, determining a position of the mobile device based on at least one of the first set of signals and the second set of signals, determining an orientation of the mobile device based on at least one of the first set of signals and the second set of signals, and generating at least one of a two-dimensional and a three-dimension view of an environment based on the position and orientation of the mobile device.

According to an embodiment of the method, user functions of the mobile device are controlled based on the first set of signals.

According to one implementation of the method of the present invention, the first set of signals is generated by an inertial sensor. The first set of signals may be representative of a linear acceleration of the mobile device in x, y, and z directional axes, and a rotational velocity of the mobile device about x, y, and z axes. Furthermore, the second set of signals may be generated by a GPS receiver. This implementation advantageously allows for calibration of a position determined from the signals provided by the inertial sensor using position information derived from the signals provided by the GPS receiver.

To obtain extensive data for generating detailed images during navigation, the mobile device receives local navigation image information and generates a two-dimensional and/or a three-dimension view of the environment based on the determined position and orientation of the mobile device using the received local navigation image information.

The method of the present invention can include further operations tailored to specific applications. Such applications may include navigating a virtual space using received local navigation image information that provides graphical details of the virtual space, receiving local maritime image information at a coastal area and generating a map view of the coastal area and a three-dimensional view of the coast including hazards using the received local maritime image information, and, in an aeronautical transport vehicle, simulating on-board navigational instruments in a user interface using the data derived from the first set of signals and the second set of signals.

The present invention also provides a visual navigation system that includes a source of navigation information including map information and image information and a mobile device. The source includes means for transmitting the navigation information and the mobile device includes means for receiving navigation information from the source, an inertial sensor, a GPS receiver, and a processor coupled to the inertial sensor, the GPS receiver, and the receiving means. The processor further includes: i) a navigation module that calculates a position of the mobile device using data from the inertial sensor and the GPS receiver and generates map data using the received map information and the estimated position; and ii) a user interface generator module that calculates an orientation of the mobile device using data from the inertial sensor, generates a three-dimensional simulation using the position calculated by the navigation module, the calculated orientation, and received image information, and controls user functions in accordance with signals received via the inertial sensor.

DETAILED DESCRIPTION

Figure 1:
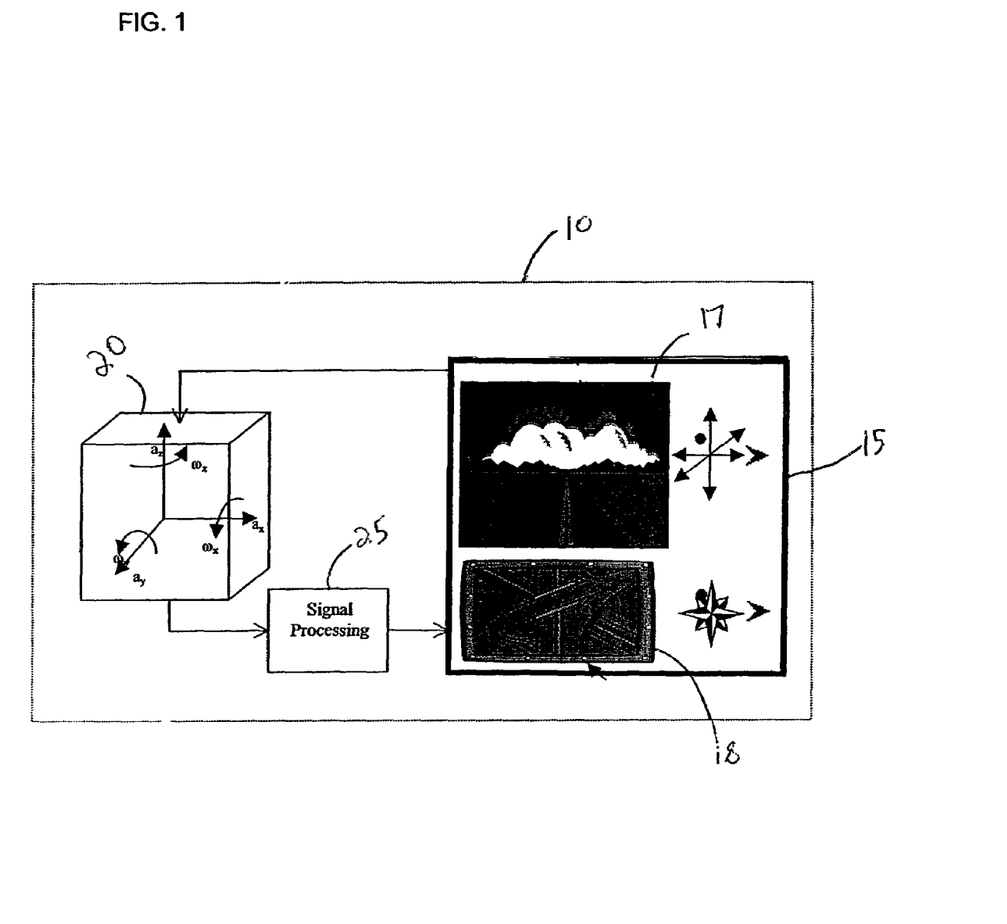
FIG. 1 is a functional block diagram of a mobile device with enhanced user orientation and navigation capability according to the present invention.

FIG. 1 depicts a functional view of a mobile device with enhanced user orientation and navigation capability according to the present invention. As shown, mobile device 10 includes a visualization interface 15 having display areas 17, 18, which may be implemented as liquid crystal displays (LCDs), for illustrating a navigated environment. According to one embodiment, one display area 17 depicts a three-dimensional view of the navigated environment in accordance with a particular viewer orientation, and display area 18 depicts a two-dimensional plan view oriented on the display in accordance with the same viewer orientation. The displays may also depict graphical user interface controls such as buttons for user control. As will be described further below, the navigated environment depicted may correspond to the actual environment in which the mobile device is located at a given time, but also may correspond to a different "virtual" environment which a user navigates through by means of the movement of the mobile device.

Such navigation is accomplished using sensors, depicted in block 20, which provide signals for estimation of the movement of the mobile device. As described below, according to a first embodiment, the sensors include inertial acceleration and rotational velocity sensors that provide for estimation of both the relative translation and the rotation of the mobile device (with respect to a reference frame) in addition to one or more GPS receivers for estimating either absolute position alone (using one GPS receiver) or both absolute position and orientation (using two or more GPS receivers). According to another embodiment, the sensors include multiple GPS receivers for estimating absolute position and orientation in three dimensions without use of inertial sensors. The inertial sensors provide direct signals that may be used for certain types of user interaction such as for changing the state of a graphical user interface control. Thus, if the user abruptly moves or twists the mobile device, causing a sudden increase in acceleration or rotational velocity, basic user functions such as on/off, start, load etc. can be activated. Slower or smoother movements can be used for navigation by processing the various acceleration, rotational velocity and/or GPS location signals in block 25 to obtain an attitude (defined as the orientation of the mobile device in terms of heading, pitch, and roll angles with respect to x,y, and z axes) and location by integration.

Figure 2:
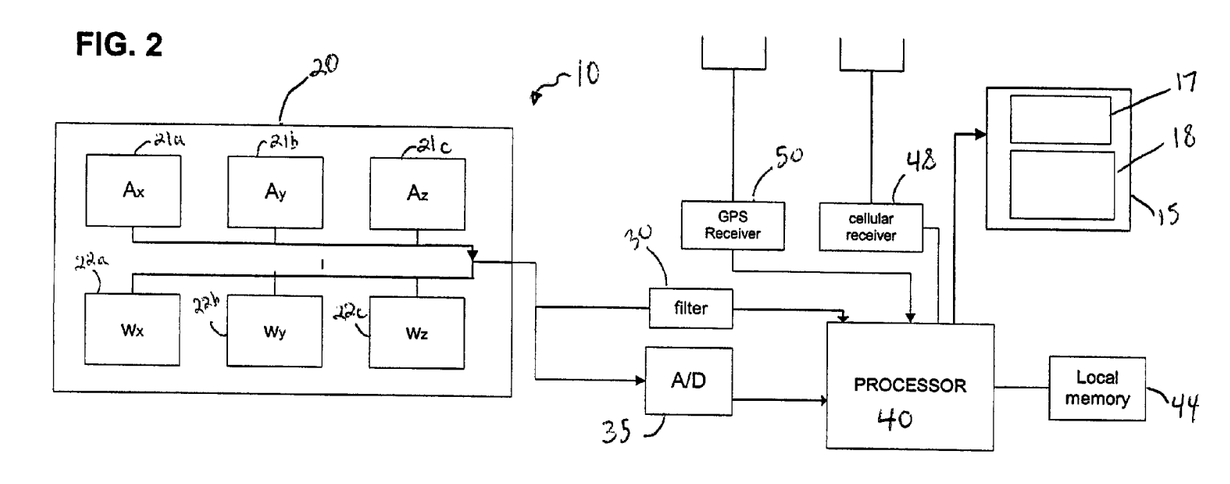
FIG. 2 is a schematic block diagram illustrating components of the mobile device according to the first embodiment of the present invention.

FIG. 2 depicts a more detailed schematic view of the mobile device according to the first embodiment of the present invention. As shown, sensor block 20 includes six separate sensors: three linear acceleration sensors 21a, 21b, 21c which measure linear acceleration in x, y, and z directions in a Cartesian coordinate system, and rotational velocity sensors 22a, 22b, 22c, which measure rotational velocities about the respective x, y, and z axes. The inertial sensors may be implemented as integrated microelectromechanical system (MEMS) components that have an acceptable degree of sensitivity. As a user moves (along with the mobile device 10) or deliberately moves the mobile device while at rest, the sensors 21a, b, c and 22a, b, c detect a relative movement and generate corresponding electrical signals indicative of the magnitude of accelerations or rotational speeds.

The signals from the sensors 21a, b, c and 22a, b, c are delivered to analog-to-digital converter 30 where the analog signals generated by the sensors are converted to digital signals, which are then supplied to a filter element 35. The filter element 35 may be implemented as a high-pass digital filter that passes the high-frequency component of the digital signals output from the analog-to-digital converter 30. The output from the filter element 35 is then passed to a processor 40, which may be implemented as a microprocessor. The processor 40 determines if the high-frequency component of one or more of the sensors is of a high amplitude, which indicates that the mobile device has moved or rotated abruptly in some direction. As noted above, abrupt movements of the device 10 can be used for control operations such as turning the device on or off, activating or deactivating a control, zooming in or zooming out in the visualized environment, etc. In this manner, the processor 40 uses the output of the filter element 35 to determine whether control operations have been activated/deactivated.

The processor 40 also receives output from a GPS receiver 50. The output from the GPS receiver 50 provides a time signal that allows the processor 40 to synchronize events to the global GPS clock and also provides a position check for calibration purposes. According to an additional embodiment, the mobile device may include one or more additional GPS receivers (not shown) which can provide a rough estimate of the absolute orientation of the mobile device. The combination of inertial based sensors with a GPS receiver is advantageous because the strengths of each detection system complements the other. Inertial sensors tend to provide for more accurate movement and orientation estimations over shorter times and distances than GPS navigation systems because GPS systems have a maximal resolution and are only accurate to within several feet. Moreover, as indicated above, GPS systems generally do not provide detailed estimations of orientation, and reception of GPS signals from satellites can vary with the changing visibility of a sufficient number of satellites or beacons. Inertial sensors are particularly useful for indoor applications, where GPS signals are generally not available at all, or only with significant infrastructure costs, while the navigation systems based on inertial sensors operate with negligible infrastructure.

On the other hand, inertial sensors are subject to bias and inconsistencies due, for example, to temperature fluctuations, which may cause systematic drifts or offsets in the values for position and orientation calculated according to the signals output from these sensors. Therefore, signals generated by inertial sensors can be less consistent over long periods of time than comparable signals from GPS systems. Accordingly, it is advantageous to use the inertial sensors in general to estimate movement, and to periodically correct for drift in calculated position and/or orientation by calibrating the sensors 21a, b, c, 22a, b, c using the "standard" coordinates, times and/or orientation provided by the one or more GPS receivers 50.

To reap these advantages, the processor 40 calculates location and orientation in two ways, by integrating the signals from the inertial sensors 21a, b, c, 22a, b, c, and by calculating position coordinates from the signals received via the GPS receiver 50 according to known GPS calculation procedures. The processor 40 may include or be coupled to various GPS chip components in order to carry out the latter procedures. The processor 40 is also coupled to a local memory unit 44 that stores data concerning geographic objects such as roads, buildings, weather, images etc., to graphically render the environment in the two and three dimensional views in respective displays 17, 18. This geographic data can be obtained from docking stations to which the mobile device may be coupled from time to time during travel. In addition, or alternatively, the mobile device may receive informational updates via a cellular receiver 48.

To estimate the total translational and rotational movement of the mobile device 10, the processor 40 integrates the detected linear acceleration parameters $a_x$, $a_y$, $a_z$ supplied by the inertial sensors 21a, b, c, 22a, b, c and the rotational velocities $\omega_x$, $\omega_y$, $\omega_z$. Each integration introduces a new parameter denoting the starting conditions, i.e. the initial speed, location and attitude. These parameters are usually unknown to the mobile device 10 and therefore have to be entered or estimated. A number of initialization techniques can be used in this regard. According to one technique, drift values can be estimated during a motionless period. This may be achieved by fixing the device in some way (e.g. placing it in a cradle, or simply on a desk) and starting the calibration. An initial attitude condition can be determined by directly measuring the direction of gravitational pull in the linear accelerometers, which defines two of the three attitude angles, and then repeating the measurement for different pitch or roll angles to determine the third direction. Additionally, initial conditions for both attitude and location can be obtained by approaching a reference location and holding the device horizontally and in alignment with a map display resembling the actual surroundings. By confirming, the user sets these initial conditions. A docking station can also be used to provide initial conditions. The docking station may be arranged as a mounted station or cradle having an interface for the mobile device. Use of a docking station provides a further advantage in that site specific data (e.g. maps, directories, etc.) can be downloaded from an off-board data base to the mobile device via the docking station interface.

After calculation of location and attitude including accounting for initial conditions and correcting for sensor drift, the processor 40 uses this information to compute two-dimensional and three-dimensional visualizations of the depicted environment in respective displays 17, 18 as will be described further below.

Figure 3:
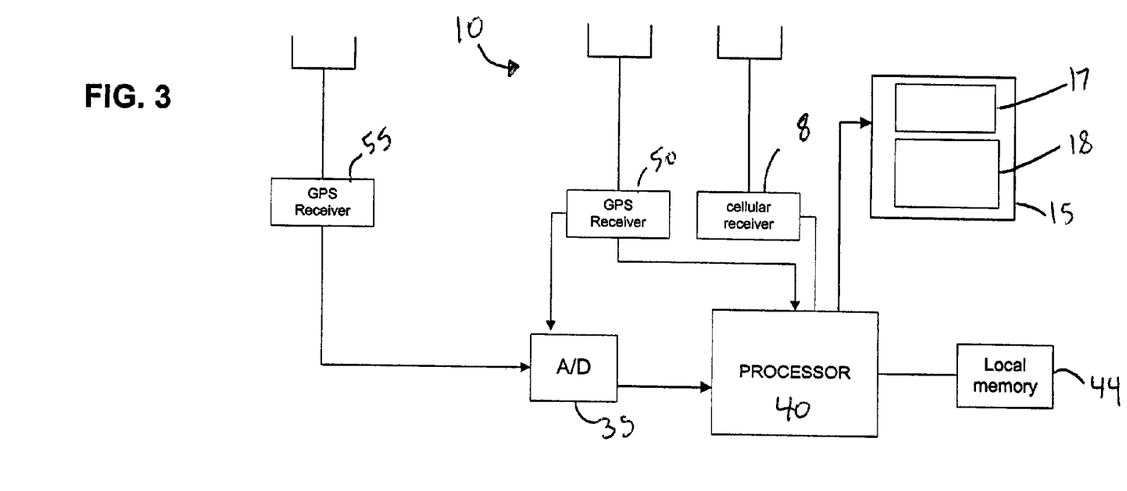
FIG. 3 is a schematic block diagram illustrating components of the mobile device according to a second embodiment of the present invention including multiple GPS receivers.

FIG. 3 depicts a schematic view of the mobile device according to a second embodiment of the present invention including multiple GPS receivers. As shown in FIG. 3, mobile device 10 includes a first GPS receiver 50 and a second GPS receiver 55. The processor 40 uses the input from the first GPS receiver 50 to calculate a coordinate position in terms of latitude, longitude, and altitude estimated by triangulation using differential times of receipt of GPS signals transmitted from a plurality of GPS satellites. Using the input from the second GPS receiver 55, located some distance from the first GPS receiver 50 on the mobile device 10, the processor can estimate the attitude of the mobile device by comparing the relative differences between the timing of GPS signals received by the respective GPS receivers 50, 55. Thus, according to this embodiment, location and attitude are estimated using the GPS system without reliance on inertial sensors.

Figure 4:
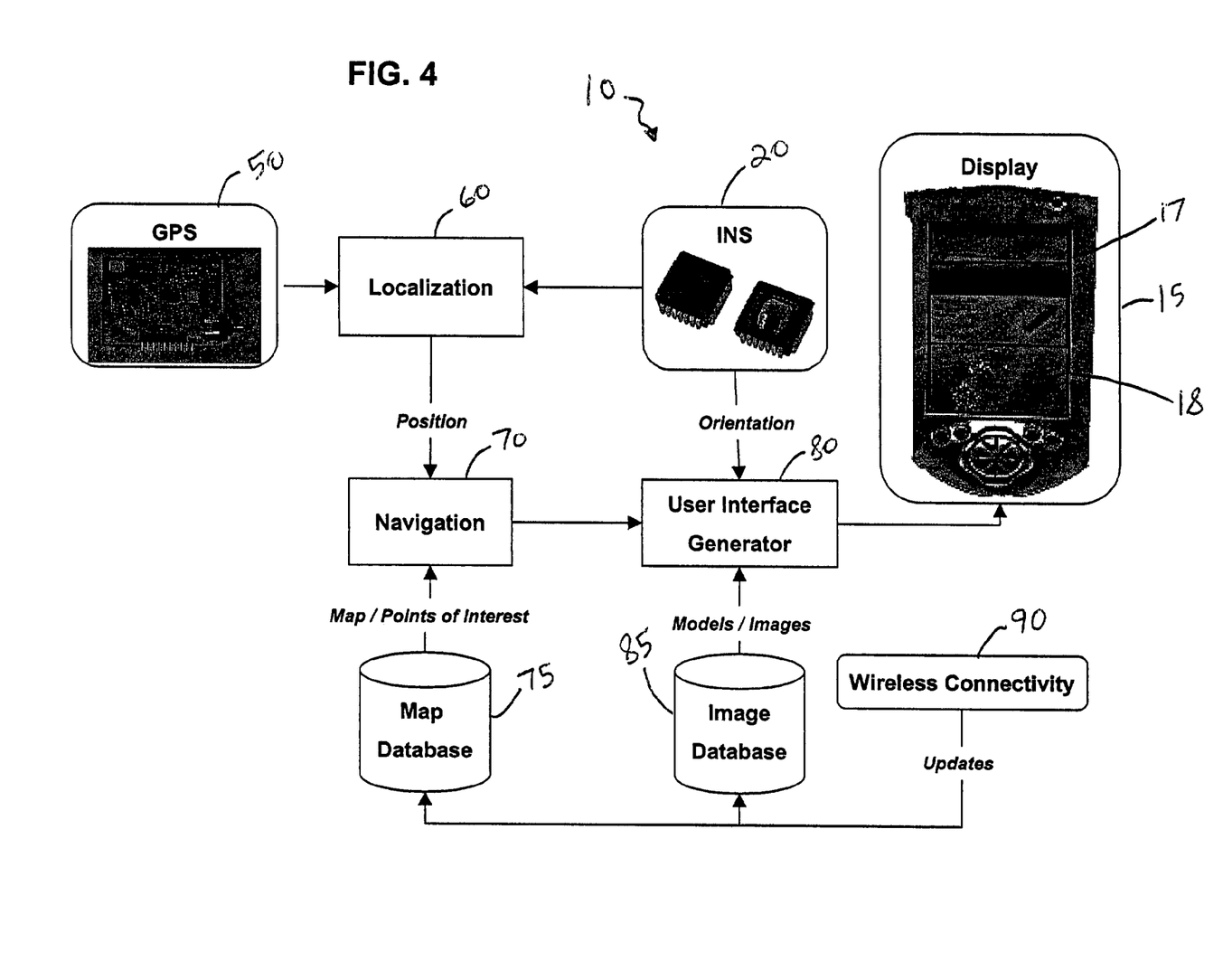
FIG. 4 depicts a software model of the mobile device according to the first embodiment of the present invention.

FIG. 4 depicts a software model of the mobile device 10 according to the first embodiment of the present invention. As shown, inertial sensor and GPS sensor blocks 20, 50 output corresponding data to a localization block 60 (implemented in the processor) where the mobile device's location in three-dimensional space is determined. The localization block provides the location information to a navigation block 70. Using the computed location, the navigation block 70 can access specific information in a map database 75 that includes the geographic and local "points of interest" information (e.g., local buildings, restaurants, gas stations, etc.) pertinent to the provided location.

It is emphasized that the information provided by the database need not correspond to the actual location of the user, but may pertain to a virtual geography that the user navigates through using the mobile device. In this manner, the "location" of the mobile device would be the position within the virtual environment, and as the user moves with the mobile device, the location within the virtual environment moves at the rate an in the direction in which the user moves. Furthermore, the visualization of the virtual environment will change as the user rotates the mobile device, effectively changing the point of view, or orientation, within the environment. As noted above, this local information may need to be updated frequently due to the user's change of location. Since the amount of data required to render each environment can be too extensive for the local memory resources of the mobile device, the data can be obtained intermittently by downloading new information (and erasing "old" information) at docking stations at various locations along the user's path and/or the information can be obtained via a cellular receiver (shown as wireless connectivity block 90) which receives transmissions from a navigational data provider designed for assisting visual navigation.

Using the obtained geographic data and local points of interest, the navigation block generates a data "map" of the navigated environment surrounding the determined position. The navigation block 70 provides the generated map to a user interface generator block 80. The user interface generator block 80 also receives inputs from the inertial sensor block 20 and an image database 85. The input from the inertial sensor block 20 includes orientation data, and the input from the image database 85 includes three-dimensional models of various buildings, features, and landmarks in the local environment, and two dimensional images, such as building textures, and billboard images, for example. The user interface generator block 80 uses the data map, the input orientation data, and the data from the image database 85 to generate the graphic visualizations in display areas 17, 18 of visualization interface 15 in accordance with both the position and the orientation of the mobile device. Moreover, as described above, the user interface generator 80 can modify the display from user commands received directly via the inertial sensor block 20. For example, the user interface generator block can cause the displays 17, 18 to go blank in response to a "turn off" command executed by the user by a sudden movement of the mobile device in a particular direction.

Figure 5:
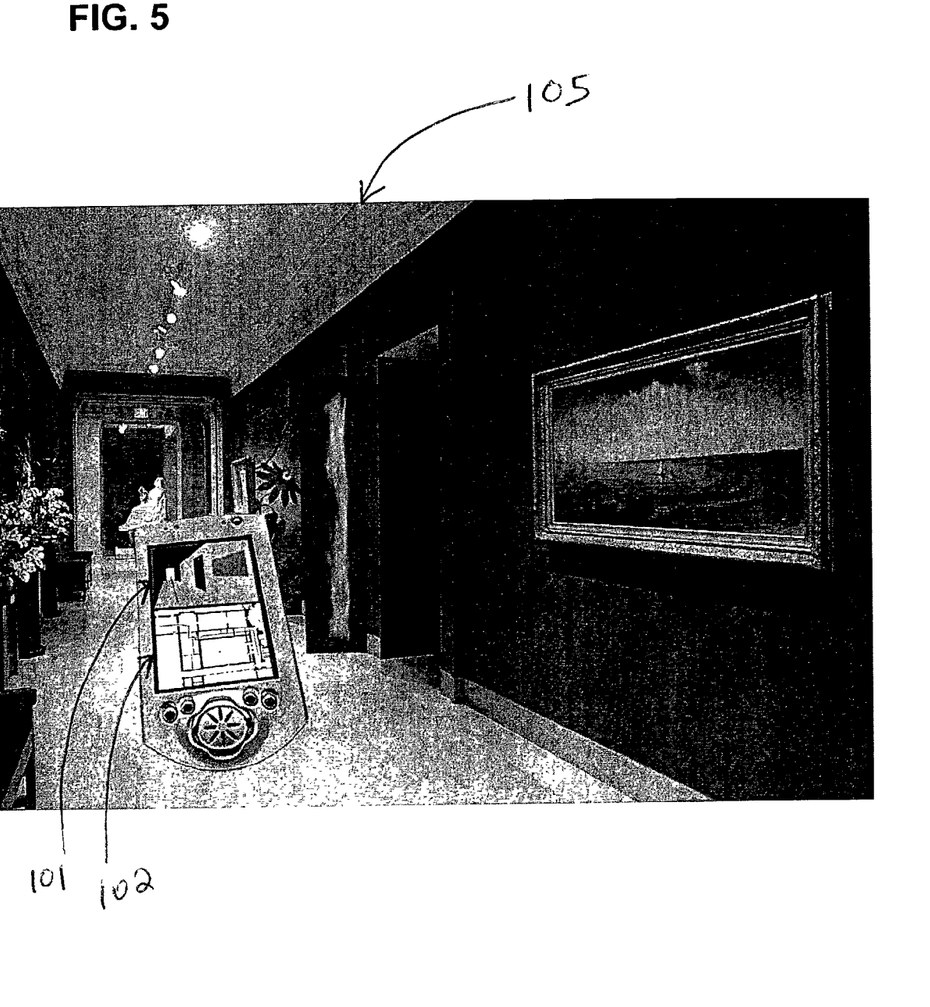
FIG. 5 illustrates a tour guide application of the mobile device according to the present invention.

There are numerous applications for which use of a mobile device with enhanced user orientation and navigation capability would be greatly beneficial. FIG. 5 illustrates a tour guide application in which the mobile device helps orient a user touring a museum by illustrating a three-dimensional simulation 101 of the current environment 105 with a two-dimensional plan view 102 of a section of the museum, giving a clear indication of the user's whereabouts within the museum, and allowing the user to plan in advance a route to the different rooms, exhibits he or she wishes to visit (the objects being representing in simplified blocks that represent the art objects but do not necessarily display them in detail). In addition, the three-dimensional view 102 may include text and audio identifying the various exhibited art objects and highlighted links to further information concerning each object in the user's immediate environment. Since the mobile device can also navigate in virtual environments, the enhanced navigation capabilities of the mobile device can allow the user to tour the museum from a separate location, so long as the mobile device is provided with the map/image data appropriate for generating the environment of the museum. In this manner, the user can find out the objects that the museum contains and estimate the time it would take to walk to various exhibits.

In a similar vein, the mobile device according to the present invention can be applied to orientation and navigation in myriad other complex environments such as fairs, conferences, public, military or corporate buildings, campuses and bases. Such touring applications can be extended to a virtual environment such as the visualization of three-dimensional models of complex machinery parts that allow a user can change the perspective and visual angle by turning (or changing the pitch/roll angle) of the mobile device. Gaming applications are another potential use of the enhanced capabilities of the mobile device of the present invention.

Figure 6:
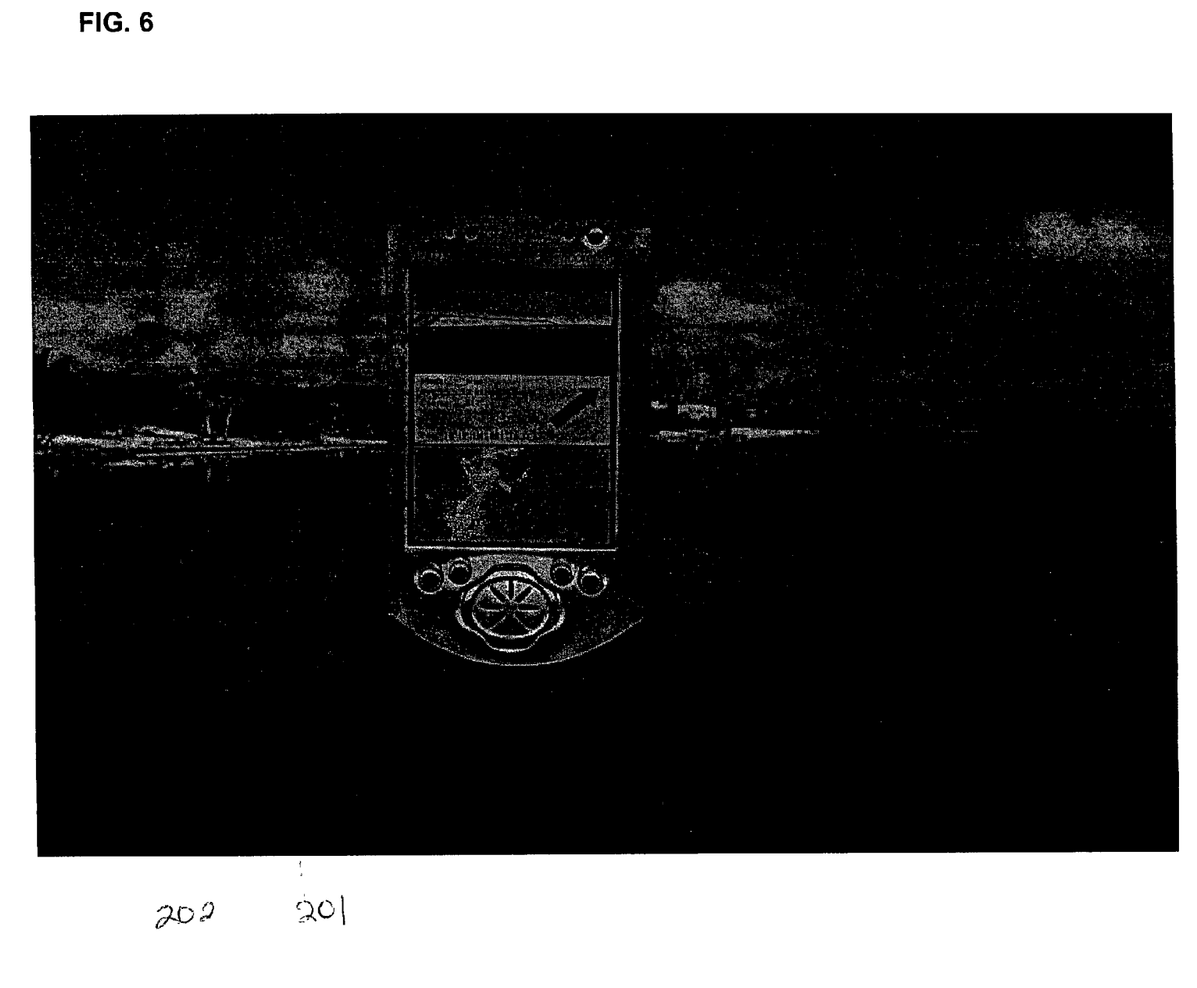
FIG. 6 illustrates maritime navigation using the mobile device according to the present invention.

FIG. 6 illustrates an advantageous use of the mobile device according to the present invention in facilitating coastal navigation. Currently, coastal navigation can be a challenging undertaking in congested areas, or areas having navigational hazards. Using the mobile device, as the user approaches the coastal area, a two dimensional map view 201 of the coastal area and a three-dimensional view 202 of the coast are displayed. By turning the mobile device, the three-dimensional view of the coast is changed, allowing the user to become oriented. The virtual view can be augmented by suggested course changes as well as navigational hazards. This application is particularly convenient because the National Maritime Association (NIMA) already provides fairly accurate digital elevation model data and digital marine charts.

Figure 7:
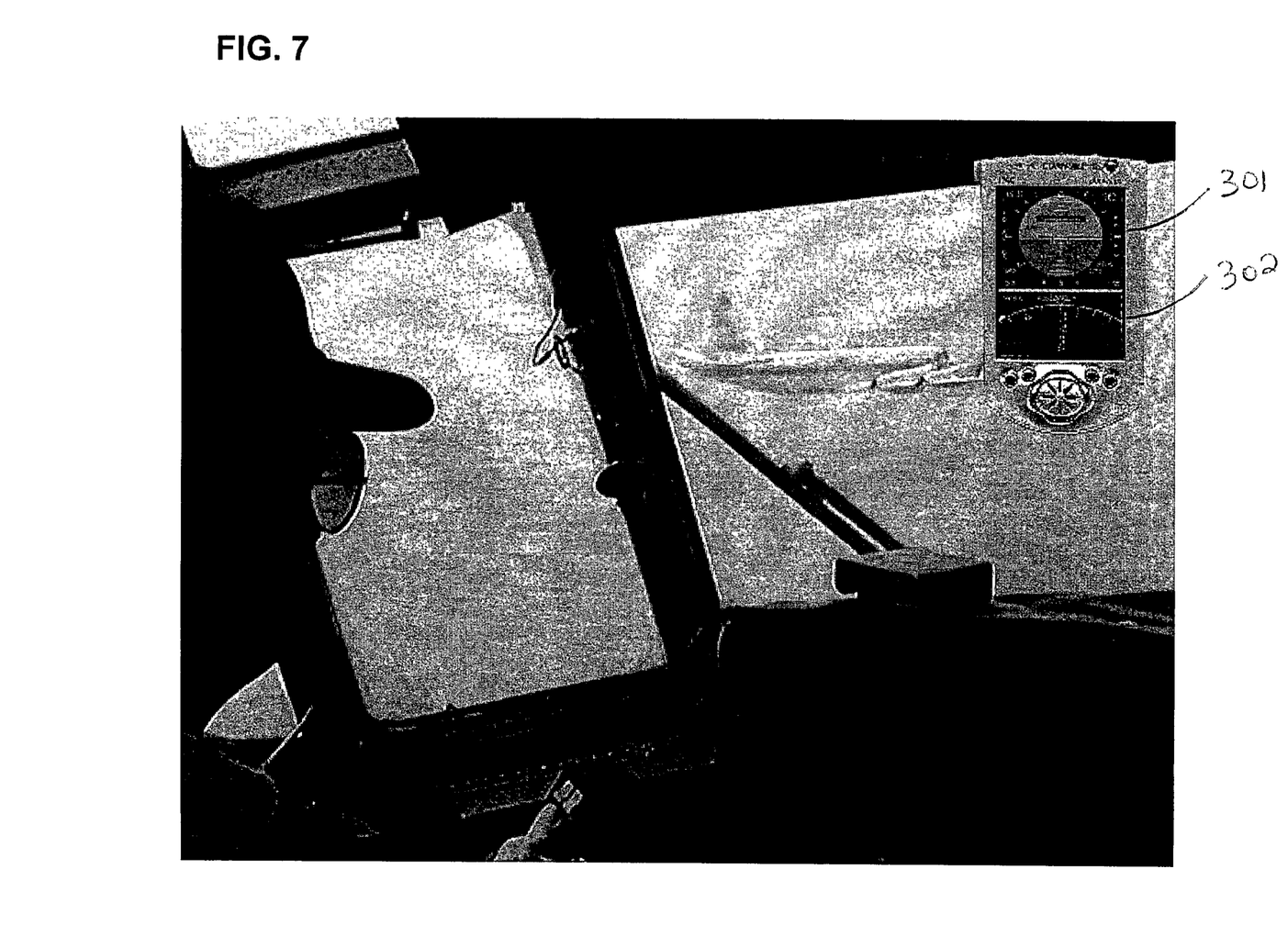
FIG. 7 illustrates a further application of the mobile device according to the present invention as a backup aeronautical instrument.

FIG. 7 illustrates another advantageous use of the mobile device of the present invention in the context of aeronautical navigation. Generally, instrumental certification requirements for airplanes are minimal, and yet a single failure of an instruments can have catastrophic effects. Since Federal Aviation Administration (FAA) endorsed flight instruments are typically costly, the mobile device according to the present invention can be used as a relatively cost-efficient backup instrument in an airplane. As shown in FIG. 6, the display areas of the mobile device emulate the displays of aeronautical instruments 301, 302 which can provide the following information: attitude, altitude, course, heading, true velocity over ground, vertical velocity, etc. Such simulation is feasible because the inertial and/or GPS sensors of the mobile device are responsive to the movement of the airplane and can thereby estimate the location and orientation of the airplane as it travels. In this manner, the mobile device can serve as a valuable backup system in case of malfunction of the primary aeronautical systems, and at a fraction of the cost of conventional instruments.

In the foregoing description, the method and system of the present invention have been described with reference to a number of examples that are not to be considered limiting. Rather, it is to be understood and expected that variations in the principles of the method and apparatus herein disclosed may be made by one skilled in the art, and it is intended that such modifications, changes, and/or substitutions are to be included within the scope of the present invention as set forth in the appended claims.

What is claimed is:

1. A mobile device for enhanced navigation and orientation, comprising:
    a visualization interface;
    a first sensor for providing signals indicative of a movement of the mobile device including an inertial sensor;
    a second sensor for providing further signals indicative of a movement of the mobile device; and
    a processor receiving the signals from the first sensor and the second sensor, the processor calculating a three-dimensional position and a three-dimensional orientation of the mobile device from the received signals, and generating a real time simulation of an environment via the visualization interface based on the calculated position and orientation;
    wherein the processor uses signals from the inertial sensor to activate or deactivate user control operations.

2. The mobile device of claim 1, wherein the first sensor includes an inertial sensor.

3. The mobile device of claim 2, further comprising:
    means for receiving navigational information pertinent to a specific environment.

4. The mobile device of claim 3, wherein the navigational information pertains to at least one of fairs, exhibits, museums, conferences, public buildings and campuses.

5. The mobile device of claim 3, wherein the navigational information pertains to marine coastal areas and potential navigational hazards.

6. The mobile device of claim 3, wherein the navigational information pertains to aeronautical navigation.

7. The mobile device of claim 6, wherein the visualization interface is configured to display simulated aeronautical instrumentation as a backup to installed on-board aeronautical instrumentation.

8. The mobile device of claim 2, wherein the inertial sensor includes linear acceleration sensors that measure accelerations of the mobile device along x, y, and z directional axes, respectively.

9. The mobile device of claim 8, wherein the inertial sensor further includes rotational velocity sensors that measure rotational velocities of the mobile device about x, y, and z axes respectively.

10. The mobile device of claim 1, wherein by manual movement of the mobile device, sensed by the first and second sensors, a user controls a point of view, a location and an attitude in at least one of a two-dimensional and a three-dimensional simulation of the environment.

11. The mobile device of claim 1, wherein navigational information derived from the GPS receiver is used to determine a bias of the inertial sensor.

12. The mobile device of claim 1, wherein the first and second sensors include GPS receivers.

13. A method for navigating using a mobile device having a visual display, comprising:
    detecting a first set of signals indicative of movement of the mobile device;
    detecting a second set of signals indicative of movement of the mobile device;
    determining a position of the mobile device based on at least one of the first set of signals and the second set of signals;
    determining an orientation of the mobile device based on at least one of the first set of signals and the second set of signals;
    generating at least one of a two-dimensional and a three-dimension view of an environment based on the position and orientation of the mobile device; and
    controlling user functions of the mobile device based on the first set of signals.

14. The method of claim 13, further comprising:
    receiving local navigation image information; and
    generating the at least one of a two-dimensional and a three-dimension view of the environment based on the position and orientation of the mobile device using the received local navigation image information.

15. The method of claim 14, further comprising:
    navigating a virtual space using received local navigation image information that provides graphical details of the virtual space.

16. The method of claim 14, further comprising:
    receiving local maritime image information at a coastal area; and
    generating a map view of the coastal area and a three-dimensional view of the coast including hazards using the received local maritime image information.

17. The method of claim 13, wherein the first set of signals is generated by an inertial sensor.

18. The method of claim 17, wherein the first set of signals are representative of a linear acceleration of the mobile device in x, y, and z directional axes, and a rotational velocity of the mobile device about the x, y, and z axes.

19. The method of claim 13, further comprising:
    calibrating a position determined from the first set of signals provided by the inertial sensor using position information derived from the second set of signals provided by the GPS receiver.

20. The method of claim 13, further comprising:
    in an aeronautical transport vehicle, simulating on-board navigational instruments in a user interface using data derived from the first set of signals and the second set of signals.

21. A mobile device for enhanced navigation and orientation, comprising:

a user interface having a visual display;

an inertial sensor, the inertial sensor detecting a movement of the mobile device, the inertial sensor providing feedback signals for user control and for generating an image in the visual display and generating signals from which a location and an attitude of the mobile device are derived;

a processor; and a means for receiving local navigation image information;

wherein the processor computes a location and an attitude of the mobile device from the signals generated by the inertial sensor, and from the location, attitude, and information from the receiving means, the processor generates an image of a local environment, the image representing a depiction of the local environment viewed from the computed location and attitude of the mobile device and in response to particular signals received from the inertial sensor, the processor activates or deactivates controls of the user interface.

22. The mobile device of claim 21, wherein the inertial sensor includes linear acceleration sensors for sensing acceleration in x, y, and z directional axes, and rotational velocity sensors for sensing rotational velocity about the x, y, and z axes.

23. A visual navigation system comprising:

a source of navigation information, the information including map information and image information, the source further including means for transmitting the navigation information;

a mobile device including:

means for receiving navigation information from the source, an inertial sensor, a GPS receiver, and a processor coupled to the inertial sensor, the GPS receiver, and the means for receiving, the processor including:

a navigation module, the navigation module calculating a position of the mobile device using data from the inertial sensor and the GPS receiver, and generating map data using the received map information and the calculated position; and a user interface generator module, the user interface generator module calculating an orientation of the mobile device using data from the inertial sensor, generating a three-dimensional simulation using the position calculated by the navigation module, the calculated orientation and received image information, and controlling user functions in accordance with signals received via the inertial sensor.

* * * * *